(12) United States Patent
Sato et al.

(10) Patent No.: US 11,532,948 B2
(45) Date of Patent: Dec. 20, 2022

(54) MANAGEMENT SYSTEM, MANAGEMENT METHOD, OPERATION TERMINAL AND CONTROL DEVICE

(71) Applicant: KYOCERA CORPORATION, Kyoto (JP)

(72) Inventors: Yuri Sato, Kawasaki (JP); Kazutaka Nakamura, Yokohama (JP); Akihiro Shiga, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 1158 days.

(21) Appl. No.: 15/999,778

(22) PCT Filed: Feb. 16, 2017

(86) PCT No.: PCT/JP2017/005705
§ 371 (c)(1),
(2) Date: Aug. 20, 2018

(87) PCT Pub. No.: WO2017/142015
PCT Pub. Date: Aug. 24, 2017

(65) Prior Publication Data
US 2021/0083508 A1    Mar. 18, 2021

(30) Foreign Application Priority Data
Feb. 19, 2016    (JP) .............................. JP2016-029941

(51) Int. Cl.
*H02J 13/00*        (2006.01)
*G05B 19/042*    (2006.01)
(Continued)

(52) U.S. Cl.
CPC ...... *H02J 13/00006* (2020.01); *G05B 19/042* (2013.01); *H02J 13/00* (2013.01);
(Continued)

(58) Field of Classification Search
CPC ..... H04L 9/32; H04L 9/00; H04L 9/40; H04L 67/56; H04M 1/66; H04M 1/673; G16Y 40/50
See application file for complete search history.

(56) References Cited

U.S. PATENT DOCUMENTS 9,774,711 B2    9/2017    Miyake et al.
2010/0202380 A1    8/2010    Park et al.
(Continued)

FOREIGN PATENT DOCUMENTS

CN    102333304 A    1/2012
CN    104685834 A    6/2015
(Continued)

*Primary Examiner* — Tu X Nguyen
(74) *Attorney, Agent, or Firm* — Hauptman Ham, LLP (57) ABSTRACT

A management system comprises an operation terminal configured to perform a remote operation of an equipment; and a control device configured to receive an access request from the operation terminal and transmit a request command to the equipment in response to the reception of the access request. The operation terminal comprises a user interface configured to notify a user of information specifying an expiration timing of a response waiting timer that defines a transmission interval or a reception interval of the request command.

7 Claims, 5 Drawing Sheets

(51) Int. Cl.
  *H04L 67/12* (2022.01)
  *H04Q 9/00* (2006.01)
  *H04L 67/75* (2022.01)
  *H02J 3/38* (2006.01)
  *H02J 3/32* (2006.01)

(52) U.S. Cl.
  CPC ........ *H02J 13/00022* (2020.01); *H04L 67/12* (2013.01); *H04L 67/75* (2022.05); *H04Q 9/00* (2013.01); *G05B 2219/2613* (2013.01); *G05B 2219/2639* (2013.01); *H02J 3/32* (2013.01); *H02J 3/381* (2013.01); *H02J 2300/24* (2020.01)

(56) References Cited

U.S. PATENT DOCUMENTS

| | | | |
|---|---|---|---|
| 2010/0211643 A1 | 8/2010 | Lowenthal et al. | |
| 2015/0350391 A1 | 12/2015 | Miyake et al. | |
| 2016/0277261 A9* | 9/2016 | Ansari | H04M 15/70 |

FOREIGN PATENT DOCUMENTS

| | | |
|---|---|---|
| EP | 2986021 A1 | 2/2016 |
| JP | H1168800 A | 3/1999 |
| JP | 2001-285968 A | 10/2001 |
| JP | 2010-128810 A | 6/2010 |
| WO | 2014051039 A1 | 4/2014 |

* cited by examiner

MANAGEMENT SYSTEM, MANAGEMENT METHOD, OPERATION TERMINAL AND CONTROL DEVICE

RELATED APPLICATIONS

The present application is a National Phase of International Application Number PCT/JP2017/005705, filed on Feb. 16, 2017, and claims priority to Japanese Application Number 2016-029941, filed on Feb. 19, 2016.

TECHNICAL HELD

The present invention relates to a management system, a management method, an operation terminal, and a control device.

BACKGROUND ART

Recently, a management system including a plurality of equipments and a control device for controlling the plurality of equipments has been proposed (for example, Patent Literature 1). The plurality of equipments are, for example, household electrical equipments such as air conditioner or lighting machine, distributed power supplies such as solar cells, storage batteries, or fuel power generators, and the like. The control device is referred to as, for example, a home energy management system (HEMS), a store energy management system (SEMS), a building energy management system (BEMS), a factory energy management system (FEMS), or a cluster/community energy management system (CEMS).

In order to spread the above-described management system, it is effective to share the communication standards between the plurality of equipments and the control device, and attempts have been made to standardize such communication standards.

CITATION LIST

Patent Literature

Patent Literature 1: JP 2010-128810 A

SUMMARY

A management system comprises an operation terminal configured to perform a remote operation of an equipment; and a control device configured to receive an access request from the operation terminal and transmit a request command to the equipment in response to the reception of the access request. The operation terminal comprises a user interface configured to notify a user of information specifying an expiration timing of a response waiting timer that defines a transmission interval or a reception interval of the request command.

A management method comprises transmitting an access request from an operation terminal to a control device; transmitting a request command from the control device to an equipment in response to reception of the access request; transmitting a response command from the equipment to the control device in response to reception of the request command; and notifying a user of information specifying an expiration timing of a response waiting timer from the operation terminal. The response waiting timer is a timer that defines a transmission interval or a reception interval of the request command.

An operation terminal comprises a transmitter configured to transmit an access request to a control device that controls an equipment so as to remotely operate the equipment; and a user interface configured to notify a user of information specifying an expiration timing of a response waiting timer. The response waiting timer is a timer that defines a transmission interval or reception intervals of a request command transmitted from the control device to the equipment in response to the access request.

A control device comprises a first receiver configured to receive an access request from an operation terminal; a first transmitter configured to transmit a request command to an equipment in response to reception of the access request; a second receiver configured to receive, from the equipment, a response command corresponding to the request command; and a second transmitter configured to transmit, to the equipment, information used for notification of information specifying an expiration timing of a response waiting timer. The response waiting timer is a timer that defines a transmission interval or a reception interval of the request command. The information specifying the expiration timing of the response waiting timer is notified to the user from the operation terminal.

DESCRIPTION OF EMBODIMENTS

Hereinafter, an embodiment will be described with reference to the drawings. In the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. In addition, the drawings may include portions having different dimensional relationships or ratios.

Embodiment (Power Management System)

Hereinafter, a power management system according to an embodiment will be described.

Figure 1:
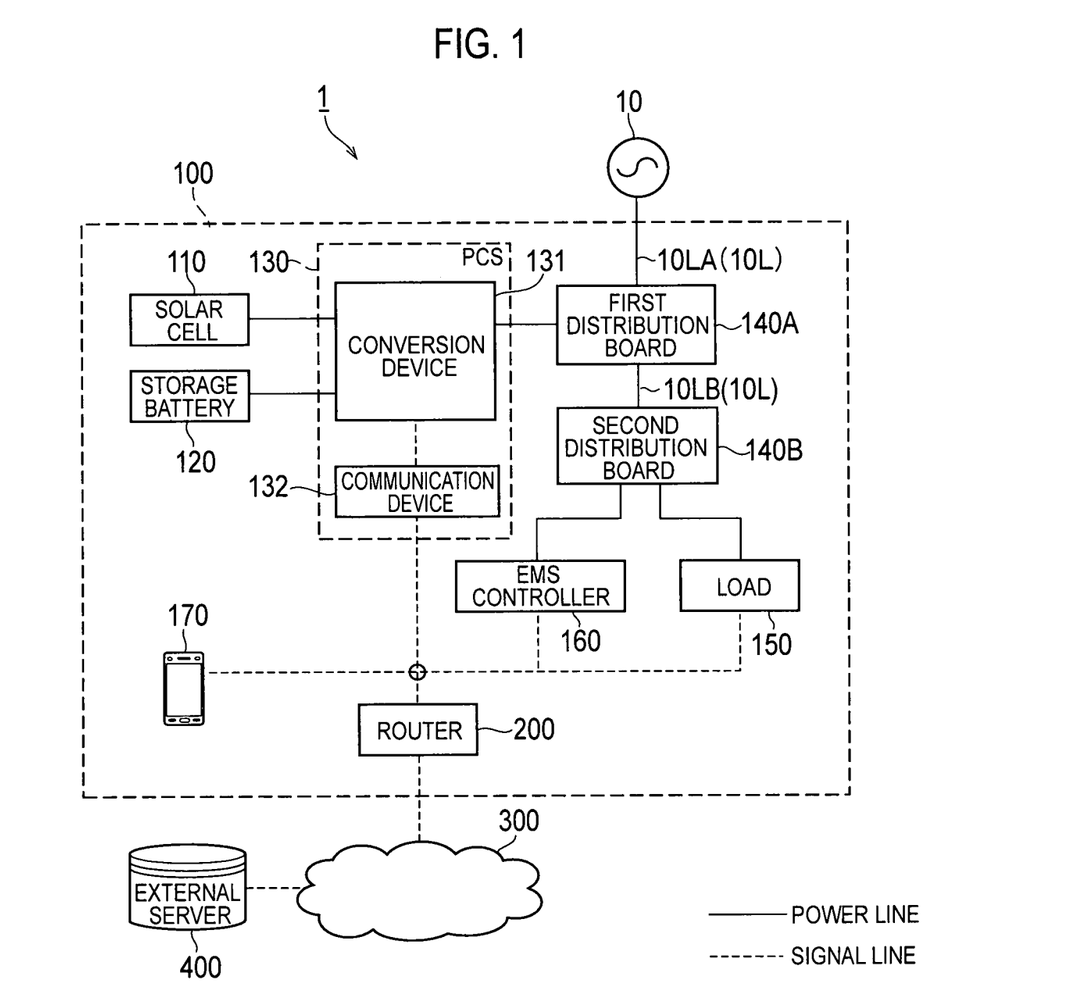
FIG. 1 is a diagram illustrating a power management system 1 according to an embodiment.

As illustrated in FIG. 1, the power management system 1 includes a facility 100 and an external server 400. The facility 100 includes a router 200. The router 200 is connected to the external server 400 via a network 300. The router 200 constitutes a local area network and is connected to, for example, a PCS 130, a load 150, an EMS controller 160, an operation terminal 170, and the like. In FIG. 1, a solid line indicates a power line, and a dashed line indicates a signal line. It should be noted that the present invention is not limited thereto, and a signal may be transmitted through a power line.

The facility 100 includes a solar cell 110, a storage battery 120, the PCS 130, a distribution board 140, the load 150, the EMS controller 160, and the operation terminal 170.

The solar cell 110 is an equipment that generates power in response to light reception. The solar cell 110 outputs the generated DC power. The power generation amount of the solar cell 110 varies according to the amount of solar radiation applied to the solar cell 110.

The storage battery 120 is an equipment that accumulates power. The storage battery 120 outputs the accumulated DC power.

The PCS 130 is an example of a power conditioning system (PCS) that converts DC power into AC power. In the embodiment, the PCS 130 includes a conversion device 131 and a communication device 132.

The conversion device 131 converts DC power input from the solar cell 110 into AC power and converts DC power input from the storage battery 120 into AC power. The conversion device 131 converts AC power supplied from a power system 10 into DC power. The communication device 132 is connected to the conversion device 131, receives various messages to the conversion device 131, and transmits various messages from the conversion device 131. In the communication between the communication device 132 and the conversion device 131, a protocol not conforming to a predetermined protocol to be described later (for example, a proprietary protocol) may be used.

In the embodiment, the conversion device 131 is connected to a main power line 10L (here, a main power line 10LA and a main power line 10LB) connected to the power system 10 via a first distribution board 140 A, and is connected to both the solar cell 110 and the storage battery 120. The main power line 10LA is a power line that connects the power system 10 and the first distribution board 140A, and the main power line 10LB is a power line that connects the first distribution board 140A and the second distribution board 140B.

The distribution board 140 is connected to the main power line 10L. The distribution board 140 includes the first distribution board 140A and the second distribution board 140B. The first distribution board 140A is connected to the power system 10 via the main power line 10LA and is also connected to the solar cell 110 and the storage battery 120 via the conversion device 131. In addition, the first distribution board 140A controls the power output from the conversion device 131 and the power supplied from the power system 10 to flow through the main power line 10LB. The power flowing from the main power line 10LB is distributed to each device (here, the load 150 and the EMS controller 160) by the second distribution board 140B.

The load 150 is an equipment that consumes the power supplied via the power line. For example, the load 150 includes equipments such as a refrigerator, a lighting, an air conditioner, a television, and the like. The load 150 may be a single equipment or a plurality of equipments.

The EMS controller 160 is an energy management system (EMS) that controls each equipment (for example, the solar cell 110, the storage battery 120, the PCS 130, or the load 150). Specifically, the EMS controller 160 is connected to each equipment via the router 200 and performs communication of a predetermined message conforming to a predetermined protocol with each equipment.

In the embodiment, the predetermined protocol is not particularly limited, and for example, may be ECHONET Lite, SEP 2.0, KNX, or the like. A predetermined format is, for example, a format conforming to ECHONET Lite. The predetermined message is, for example, a SET command, a GET command, a response command to the SET command, a response command to the GET command, or an INF command. The SET command is a message for instructing setting or operation on an equipment. The GET command is a message for acquiring the state of the equipment. The response command to the SET command is a message indicating that setting or operation instructed by the SET command has been received. The response command to the GET command is a message including the information requested by the GET command. The INF command is a message for notifying the state of the PCS 130.

The operation terminal 170 is a terminal that remotely operates each equipment (for example, the solar cell 110, the storage battery 120, the PCS 130, or the load 150) by transmitting an access request to the EMS controller 160. A protocol (for example, a proprietary protocol) not conforming to a predetermined protocol may be used for communication between the operation terminal 170 and the EMS controller 160. The operation terminal 170 is, for example, a smartphone, a tablet, or a dedicated terminal. The operation terminal 170 is connected to the EMS controller 160 by wire or by wireless and communicates with the EMS controller 160. The operation terminal 170 may perform communication of a predetermined message having a predetermined format with the EMS controller 160.

The external server 400 is a server managed by a power company or a power aggregator. The external server 400 transmits a power command message to the PCS 130 or the EMS controller 160.

The power command message is a message relating to the suppression of the forward power flow amount that is the amount of power supplied from the power system 10 or the reverse power flow amount that is the amount of power supplied to the power system 10. The power command message relating to the reduction of the forward power flow amount may be, for example, a message to the effect that a requested amount of reduction of the power consumption amount is o % reduction, a message to the effect that a requested amount of reduction of the power consumption amount is 0 kwh reduction, or a message to the effect that incentives are presented according to the reduction amount. For the message relating to the suppression of the reverse power flow, for example, a message to the effect that the reverse power flow is reduced by o % is assumed. If the distributed power supply such as the storage battery 120 provided in the facility 100 is used for a virtual power plant (VPP), the power command message may be a message for controlling the distributed power supply.

(Control Device)

Figure 2:
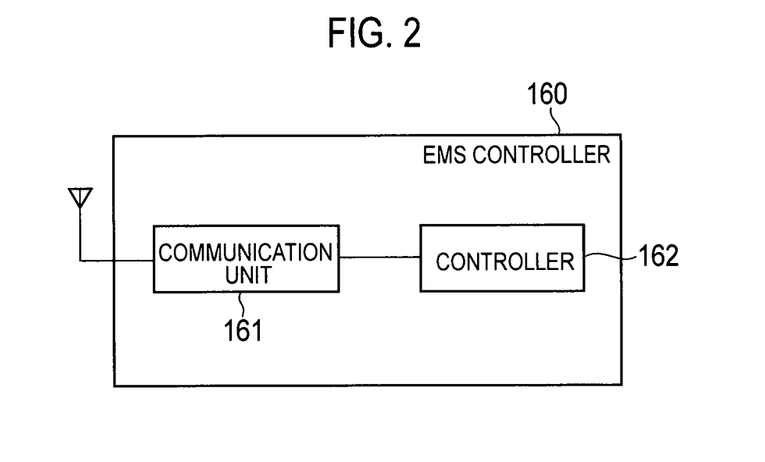
FIG. 2 is a diagram illustrating an EMS controller 160 according to an embodiment.

Hereinafter, a control device according to an embodiment will be described. As illustrated in FIG. 2, the control device (EMS controller 160) includes a communication unit 161 and a controller 162.

The communication unit 161 includes a communication module and communicates with each equipment (for example, the solar cell 110, the storage battery 120, the PCS 130, or the load 150). The communication unit 161 communicates with the operation terminal 170 and the external server 400.

The communication unit 161 is an example of a first receiver that receives the access request from the operation terminal 170. The communication unit 161 is an example of a first transmitter that transmits the request command to the equipment in response to reception of the access request.

The communication unit 161 is an example of a second receiver that receives, from the equipment, the response command corresponding to the request command. The communication unit 161 is an example of a second transmitter that transmits, to the equipment, information (for example, timer value information to be described later) used for notification of information specifying the expiration timing of the response waiting timer.

Here, the request command is a command for requesting a predetermined operation to the equipment, for example, the SET command or the GET command described above. The response waiting timer is a timer that defines the transmission interval or the reception interval of the request command.

The controller 162 includes a CPU and a memory and controls the EMS controller 160. The controller 162 manages the response waiting timer that defines the time from the timing of transmitting the request command to the timing of receiving the response command. For example, the controller 162 activates the response waiting timer in response to the transmission of the request command, and stops the response waiting timer in response to the reception of the response command to the request command. The controller 162 controls the communication unit 161 so as not to continuously transmit the request command during the activation of the response waiting timer. In other words, the controller 162 restricts the transmission of the next request command until the time corresponding to the timer value set in the response waiting timer has elapsed in response to the transmission of the request command, or until the response command corresponding to the request command is received.

(Operation Terminal)

Figure 3:
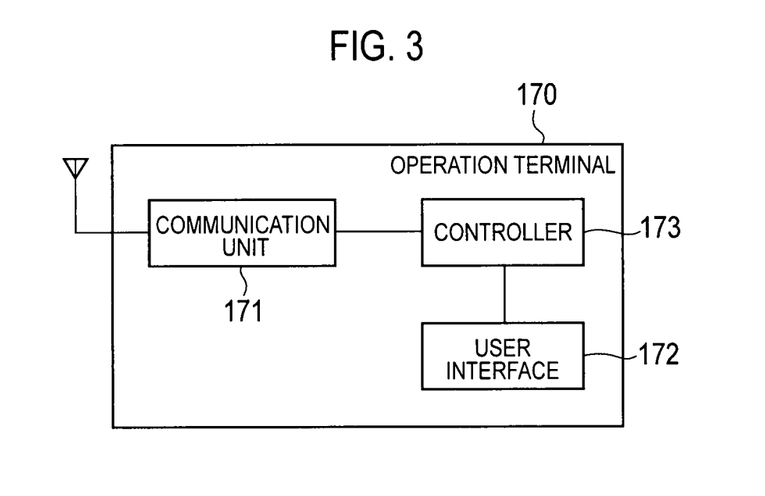
FIG. 3 is a diagram illustrating an operation terminal 170 according to an embodiment.

Hereinafter, an operation terminal according to an embodiment will be described. As illustrated in FIG. 3, the operation terminal 170 includes a communication unit 171, a user interface 172, and a controller 173.

The communication unit 171 includes a communication module and communicates with the EMS controller 160. The communication unit 171 is an example of a transmitter that transmits, to the EMS controller 160 for controlling the equipment, the access request, so as to remotely operate the equipment. The communication unit 171 transmits, to the EMS controller 160, a timer value request requesting a timer value to be set in the response waiting timer. The communication unit 171 receives, from the EMS controller 160, timer value information including information indicating the timer value to be set in the response waiting timer.

The user interface 172 includes at least one of a display and a speaker and notifies various kinds of information to the user. The user interface 172 notifies the user of information (hereinafter referred to as expiration timing information) specifying the expiration timing of the response waiting timer.

The controller 173 includes a CPU and a memory and controls the operation terminal 170. The controller 173 controls the user interface 172 to notify the expiration timing information in response to the transmission of the access request.

The mode of notifying the expiration timing information is not particularly limited, and may be a display of the timer value (count-down type or count-up type) set in the response waiting timer, or may be a display indicating whether the next access request can be received.

(Management Method)

Figure 4:
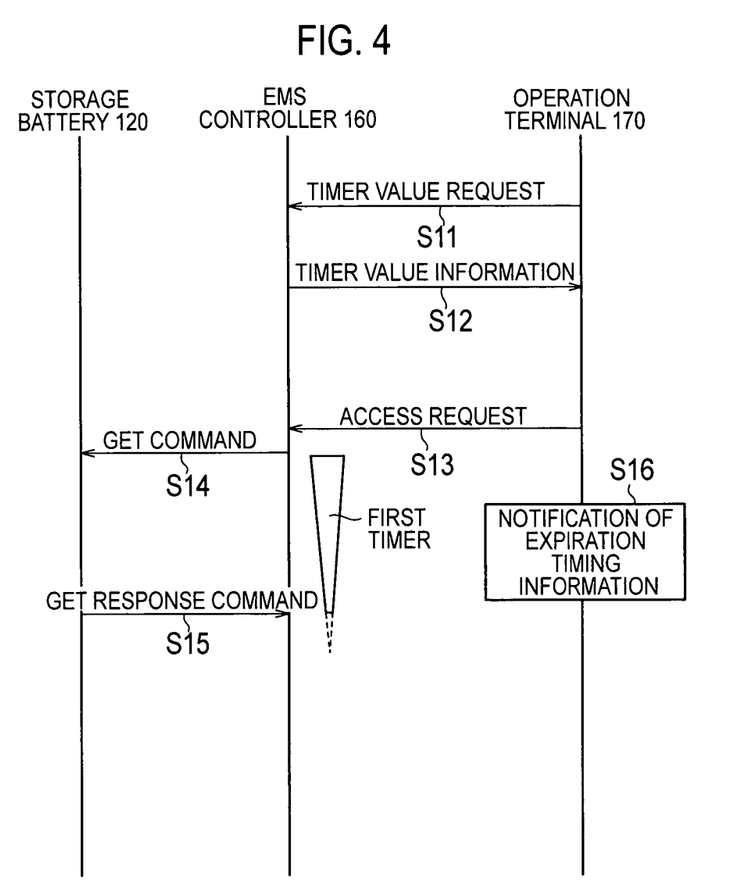
FIG. 4 is a diagram illustrating a management method according to an embodiment.

Hereinafter, a management method according to an embodiment will be described. FIG. 4 is a sequence diagram illustrating a management method according to an embodiment. In FIG. 4, the storage battery 120 is illustrated as the example of the equipment.

As illustrated in FIG. 4, in step S11, the operation terminal 170 transmits, to the EMS controller 160, the timer value request requesting the timer value set in the response waiting timer of the EMS controller 160.

In step S12, the operation terminal 170 receives, from the EMS controller 160, timer value information including information indicating the timer value to be set in the response waiting timer of the EMS controller 160.

In step S13, the operation terminal 170 transmits the access request to the EMS controller 160 so as to remotely operate the storage battery 120. Here, the access request is a request for acquiring the state of the storage battery 120.

In step S14, the EMS controller 160 transmits, to the storage battery 120, the request command corresponding to the access request. Here, the request command is the above-described GET command. The EMS controller 160 activates the response waiting timer (first timer) in response to the transmission of the GET command.

In step S15, the EMS controller 160 receives, from the storage battery 120, the response command to the request command. Here, the response command is the GET response command including information indicating the state of the storage battery 120. The EMS controller 160 stops the response waiting timer (first timer) in response to the reception of the GET response command. That is, the EMS controller 160 is ready to transmit the next request command. Here, the response waiting timer expires in response to the reception of the GET response command. However, the response waiting timer may expire with the lapse of time corresponding to the timer value.

In step S16, the operation terminal 170 notifies the user of the expiration timing information in response to the transmission of the access request. As described above, the mode of notifying the expiration timing information may be a display of the timer value (count-down type or count-up type) set in the response waiting timer, or may be a display indicating whether the next access request can be received.

Operation and Effect

In the embodiment, the operation terminal 170 notifies the user of information specifying the expiration timing of the response waiting timer. Therefore, even if the operation terminal 170 is used to remotely operate the equipment, it is possible to reduce the possibility that the request command will be continuously transmitted from the EMS controller 160 to the equipment before the expiration of the response waiting timer, and it is possible to reduce the load of the control device.

Modification 1

Hereinafter, Modification 1 will be described below. The difference from the embodiment will be mainly described below.

In the embodiment, the operation terminal 170 acquires, from the EMS controller 160, the timer value to be set in the response waiting timer (step S11 and step S12 illustrated in FIG. 4). On the other hand, in Modification 1, the process of obtaining the timer value may be omitted.

Figure 5:
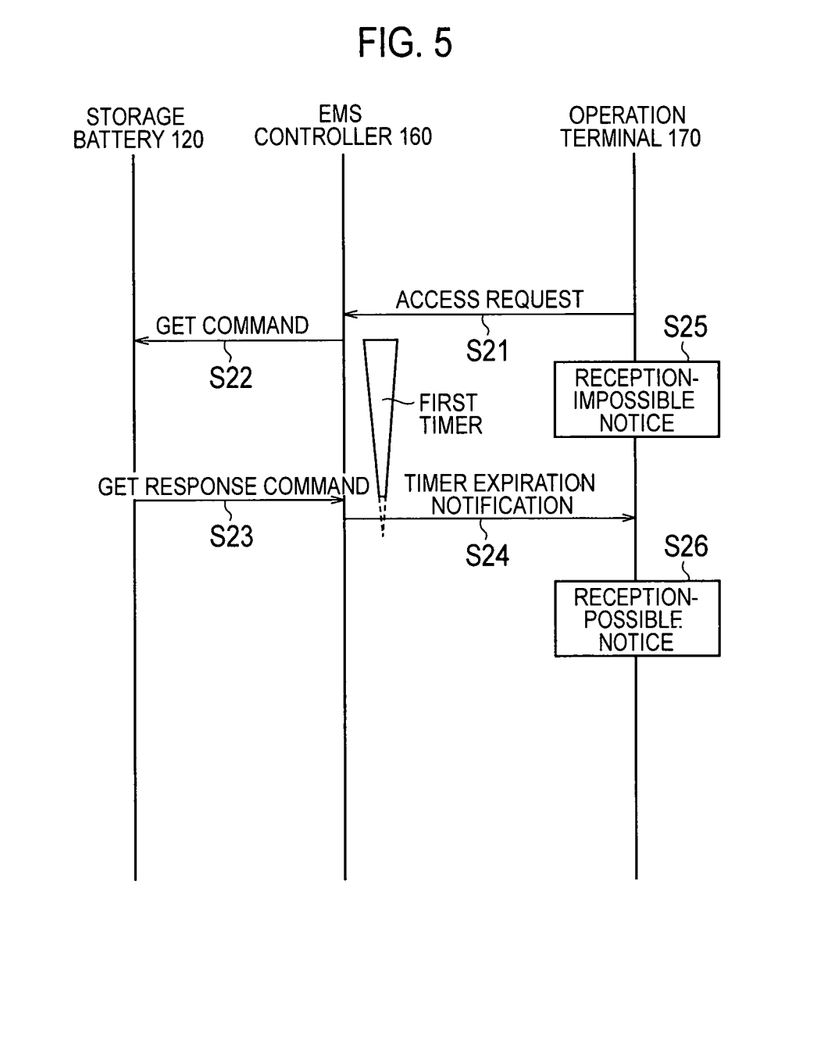
FIG. 5 is a diagram illustrating a management method according to Modification 1.

Specifically, as illustrated in FIG. 5, in step S21, the operation terminal 170 transmits the access request to the EMS controller 160 so as to remotely operate the storage battery 120. Here, the access request is a request for acquiring the state of the storage battery 120.

In step S22, the EMS controller 160 transmits, to the storage battery 120, the request command corresponding to the access request. Here, the request command is the above-described GET command. The EMS controller 160 activates the response waiting timer (first timer) in response to the transmission of the GET command.

In step S23, the EMS controller 160 receives, from the storage battery 120, the response command to the request command. Here, the response command is the GET response command including information indicating the state of the storage battery 120. The EMS controller 160 stops the response waiting timer (first timer) in response to the reception of the GET response command. That is, the EMS controller 160 is ready to transmit the next request command.

In step S24, the EMS controller 160 transmits, to the operation terminal 170, the timer expiration notification indicating the expiration of the response waiting timer. Here, the response waiting timer expires in response to the reception of the GET response command. However, the response waiting timer may expire with the lapse of time corresponding to the timer value.

Under such an assumption, in step S25, the operation terminal 170 notifies the information indicating that the next access request cannot be received (reception-impossible notice) in response to the transmission of the access request. In step S26, the operation terminal 170 notifies the information indicating that the next access request can be received (reception-possible notice) in response to the reception of the timer expiration notification. Here, it should be noted that the processes of steps S25 and 26 are an example of a process of notifying the user of information (expiration timing information) specifying the expiration timing of the response waiting timer.

Modification 2

Hereinafter, Modification 2 of the embodiment will be described. The difference from the embodiment will be mainly described below.

Figure 6:
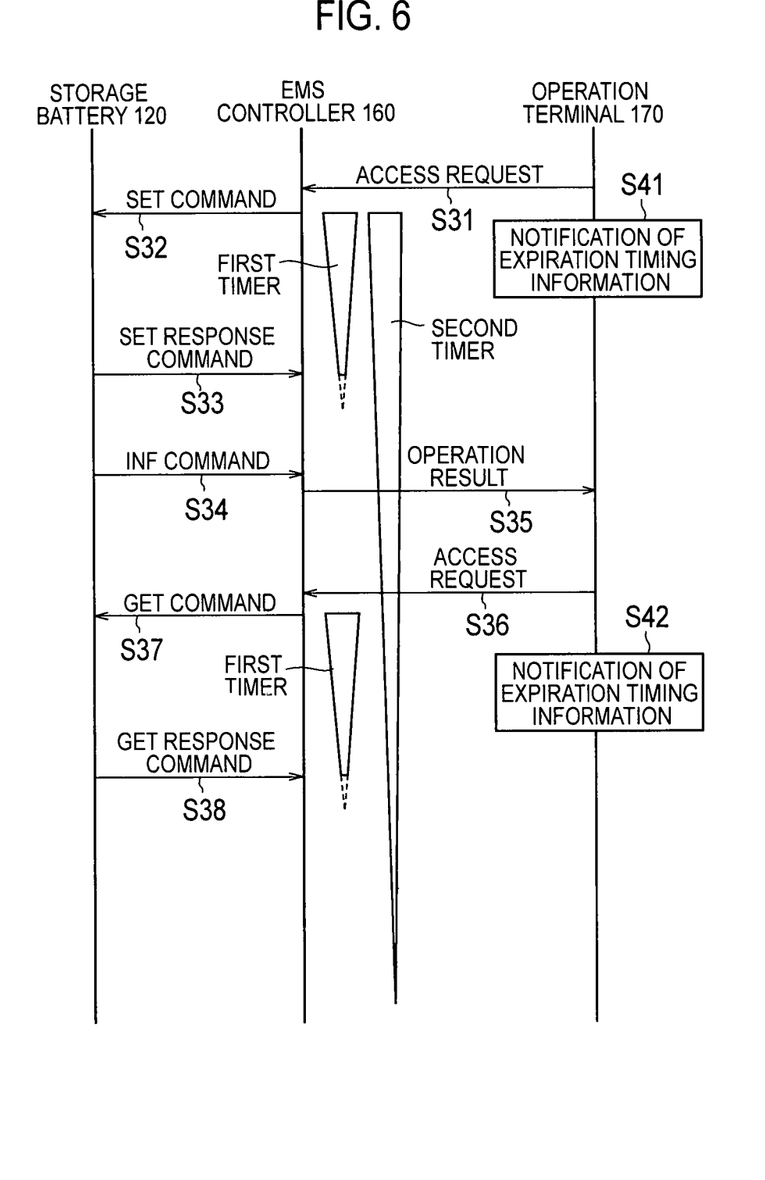
FIG. 6 is a diagram illustrating a management method according to Modification 2.

In Modification 2, the EMS controller 160 includes a first timer and a second timer as response waiting timers. The second timer is an example of an operation mode resetting waiting timer applied to the operation mode setting request command requesting the setting of the operation mode of the storage battery 120. The first timer is an example of a timer applied to a command other than the operation mode setting request command. For example, the operation mode setting request command is a SET command, and the command other than the operation mode setting request command is a GET command.

As illustrated in FIG. 6, in step S31, the operation terminal 170 transmits the access request to the EMS controller 160 so as to remotely operate the storage battery 120. Here, the access request is a request for setting the operation mode of the storage battery 120.

In step S32, the EMS controller 160 transmits, to the storage battery 120, the request command corresponding to the access request. Here, the request command is the above-described SET command. In response to the transmission of the SET command, the EMS controller 160 activates the first timer and activates the second timer. The reason why the first timer as well as the second timer is activated is because, even before the expiration of the second timer, the command other than the operation mode setting request command can be transmitted if the first timer has expired.

In step S33, the EMS controller 160 receives, from the storage battery 120, the response command to the request command. Here, the response command is the SET response command indicating that the setting of the operation mode of the storage battery 120 has been received. The EMS controller 160 stops the first timer in response to the reception of the SET response command. Meanwhile, the EMS controller 160 does not stop the second timer in response to the reception of the SET response command. That is, although the EMS controller 160 is ready to transmit the command other than the operation mode setting request command, the EMS controller 160 does not become ready to transmit the operation mode setting request command.

In step S34, the storage battery 120 transmits, to the EMS controller 160, the INF command indicating the setting contents of the operation mode of the storage battery 120 in response to the setting completion of the operation mode of the storage battery 120.

In step S35, the EMS controller 160 transmits, to the operation terminal 170, the operation result for the access request received in step S31.

In step S36, the operation terminal 170 transmits the access request to the EMS controller 160 so as to remotely operate the storage battery 120. Here, the access request is a request for acquiring the state of the storage battery 120.

In step S37, the EMS controller 160 transmits, to the storage battery 120, the request command corresponding to the access request. Here, the request command is the above-described GET command. The EMS controller 160 activates the first timer in response to the transmission of the GET command.

In step S38, the EMS controller 160 receives, from the storage battery 120, the response command to the request command. Here, the response command is the GET response command including information indicating the state of the storage battery 120. The EMS controller 160 stops the first timer in response to the reception of the GET response command. That is, the EMS controller 160 is ready to transmit the command other than the operation mode setting request command.

Under such an assumption, in step S41, the operation terminal 170 notifies both the expiration timing information about the first timer and the expiration timing information about the second timer in response to the transmission of the access request in step S31. On the other hand, in step S42, the operation terminal 170 notifies the expiration timing information about the first timer in response to the transmission of the access request in step S36. In step S42, the notification of the expiration timing information about the second timer may be continued.

As described above, the mode of notifying the expiration timing information about the first timer and the second timer may be a display of the timer value (count-down type or count-up type) set in the response waiting timer, or may be a display indicating whether the next access request can be received.

OTHER EMBODIMENTS

Although the present invention has been described with reference to the above-described embodiments, it should not be understood that the description and drawings constituting a part of this disclosure limit the present invention. From this disclosure, various alternative embodiments, examples, and operational technologies will become apparent to those skilled in the art.

In the embodiment, the response waiting timer defines the transmission interval of the request command and is provided in the EMS controller 160, but the embodiment is not limited thereto. The response waiting timer defines the reception interval of the request command and may be provided in the equipment.

The timer value set in the response waiting timer may be determined according to the contents of the request command. The contents of the request command may be the message type (GET or SET) of the request command, may be the contents of the operation executed by the equipment, or may be the contents of the information included in the response command transmitted by the equipment.

If the request command is transmitted or received during the activation of the response waiting timer, the request command may be executed after the expiration of the response waiting timer, or may be discarded.

The EMS controller 160 is a device connected to the network 300, and the function of the EMS controller 160 may be provided by a cloud service via the network 300.

The operation terminal 170 may be able to access the EMS controller 160 via a local area network provided in the facility 100, and may be able to access the EMS controller 160 via a wide area network not provided in the facility 100.

The notification mode in the response waiting timer is not limited to the display of the timer value. For example, the notification mode may display whether the reception of the access request is possible, and may display that the access request is not received. As the display for which the access request is not received, characters may be displayed, or the entire display screen may be grayed out.

The entire contents of Japanese Patent Application No. 2016-29941 (filed on Feb. 19, 2016) are incorporated herein by reference.

The invention claimed is:

1. A management system comprising:
an operation terminal configured to perform a remote operation of an equipment; and
a control device configured to receive an access request from the operation terminal and transmit a request command to the equipment in response to reception of the access request, wherein
the operation terminal comprises a user interface configured to notify a user of information specifying an expiration timing of a response waiting timer that defines a transmission interval or a reception interval of the request command, and
a timer value set in the response waiting timer is determined according to contents of the request command.

2. The management system according to claim 1, wherein the operation terminal comprises a receiver configured to receive, from the equipment, information indicating the timer value set in the response waiting timer via the control device.

3. The management system according to claim 1, wherein the operation terminal comprises a receiver configured to receive, from the equipment, information indicating expiration of the response waiting timer via the control device.

4. The management system according to claim 1, wherein the equipment is a storage battery,
the request command includes an operation mode setting request command requesting a setting of an operation mode of the storage battery, and
the response waiting timer includes an operation mode resetting waiting timer applied to the operation mode setting request command.

5. A management method, comprising:
transmitting an access request from an operation terminal to a control device;
transmitting a request command from the control device to an equipment in response to reception of the access request;
transmitting a response command from the equipment to the control device in response to reception of the request command; and
notifying a user of information specifying an expiration timing of a response waiting timer from the operation terminal,
wherein
the response waiting timer is a timer that defines a transmission interval or a reception interval of the request command, and
a timer value set in the response waiting timer is determined according to contents of the request command.

6. An operation terminal, comprising:
a transmitter configured to transmit an access request to a control device that controls an equipment so as to remotely operate the equipment; and
a user interface configured to notify a user of information specifying an expiration timing of a response waiting timer,
wherein
the response waiting timer is a timer that defines a transmission interval or reception intervals of a request command transmitted from the control device to the equipment in response to the access request, and
a timer value set in the response waiting timer is determined according to contents of the request command.

7. A control device, comprising:
a first receiver configured to receive an access request from an operation terminal;
a first transmitter configured to transmit a request command to an equipment in response to reception of the access request;
a second receiver configured to receive, from the equipment, a response command corresponding to the request command; and
a second transmitter configured to transmit, to the equipment, information used for notification of information specifying an expiration timing of a response waiting timer,
wherein
the response waiting timer is a timer that defines a transmission interval or a reception interval of the request command,
the information specifying the expiration timing of the response waiting timer is notified to user from the operation terminal, and
a timer value set in the response waiting timer is determined according to contents of the request command.

* * * * *